United States Patent [19]

Ikeuchi

[11] 3,968,508
[45] July 6, 1976

[54] PHOTOGRAPHIC CAMERA WITH MULTIPLE EXPOSURE MEANS

[75] Inventor: Takeshi Ikeuchi, Osaka, Japan

[73] Assignee: Minolta Camera Kabushiki Kaisha, Osaka, Japan

[22] Filed: July 23, 1974

[21] Appl. No.: 491,093

[30] Foreign Application Priority Data
July 24, 1973 Japan.......................... 48-86963[U]
June 17, 1974 Japan................................ 49-68170

[52] U.S. Cl. ............................................. 354/209
[51] Int. Cl.² .......................................... G03B 19/02
[58] Field of Search............................. 354/209, 204

[56] References Cited
UNITED STATES PATENTS

| | | | |
|---|---|---|---|
| 3,621,770 | 11/1971 | Tsuruoka | 354/209 |
| 3,650,191 | 3/1972 | Nomura | 354/209 |
| 3,687,039 | 8/1972 | Furuta | 354/209 |
| 3,829,876 | 8/1974 | Uno | 354/209 |

*Primary Examiner*—R. L. Moses
*Attorney, Agent, or Firm*—Wolder & Gross

[57] ABSTRACT

A self-cocking camera is provided with a manually operated mode selection member which permits the camera mechanism to be selectively set to either a single-exposure mode in which actuation of a winding lever cocks the shutter mechanism for exposure and simultaneously advances the film by one frame, and a multiple-exposure mode in which actuation of the winding lever cocks the shutter mechanism without advancing the film. The mechanism includes an engaging member which is normally positioned to engage a tooth of a ratchet wheel to advance the film when the winding lever is actuated, but which is moved by operation of the mode selection member to a position in which it is out of alignment with the ratchet for multiple exposure.

10 Claims, 21 Drawing Figures

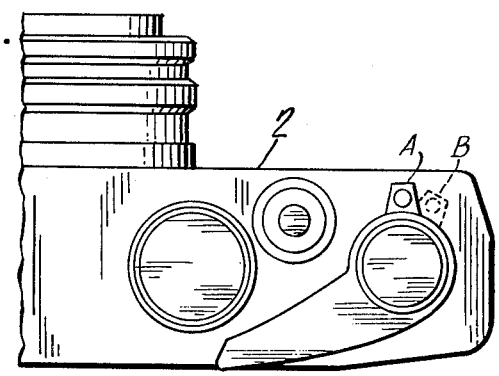
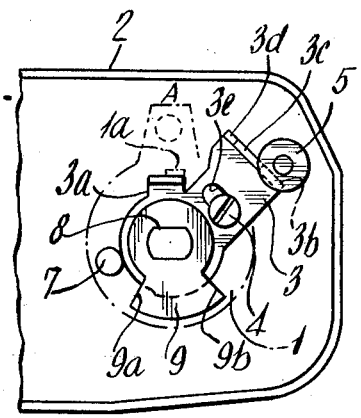
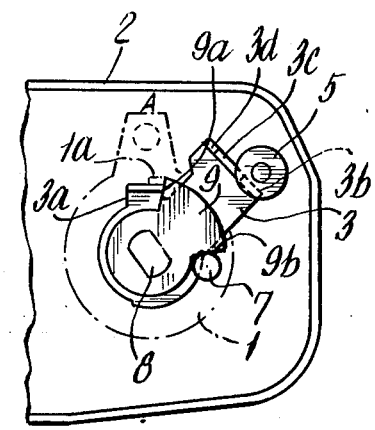
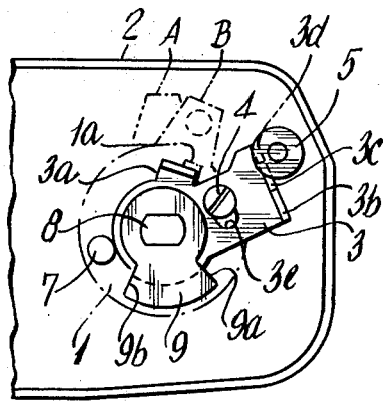
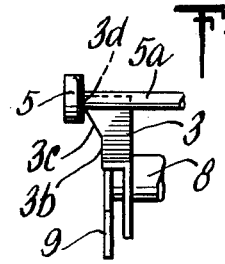
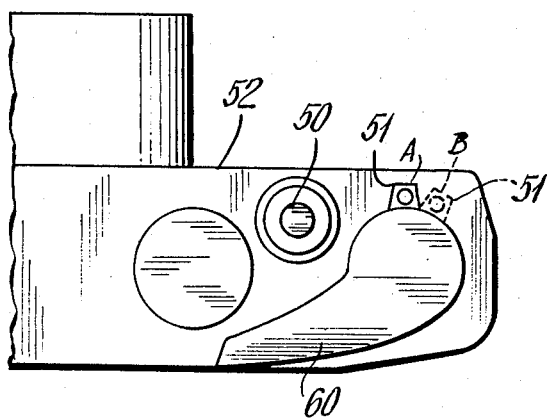

3,968,508

PHOTOGRAPHIC CAMERA WITH MULTIPLE EXPOSURE MEANS

BACKGROUND OF THE INVENTION

The present invention relates to a photographic camera adapted for multiple exposure on a single frame of a film, and more particularly to a camera of the self-cocking type, in which cocking of a shutter is effected automatically in association with frame-by-frame feeding of the film. For multiple exposure on a single frame, the film winding mechanism is temporarily disengaged from the shutter cocking mechanism to thereby allow the shutter cocking without advancing the film. In such a camera, the film winding mechanism and the shutter cocking mechanism are automatically returned to their initial positions where they are functionally associated, after the completion of the shutter cocking for the aforesaid multiple exposure operation.

SUMMARY OF THE INVENTION

In self-cocking cameras of this type, the multiple exposure mode of operation has hitherto been attempted by use of a sprocket which is disengaged from a sprocket shaft by utilizing a clutch mechanism which is originally provided in the camera for rewinding operation of the film, when effecting shutter cocking. Then the clutch is automatically returned to the engaging condition at the final stage of the shutter cocking. However, difficulties have been experienced with the timing of the return movement of the clutch to its engaging condition. Stated differently, since the sprocket shaft is being rotated during the shutter cocking, the premature returning of a clutch will cause feeding or advancement of the film.

Another attempt at multiple exposure operation provided a clutch interposed between the shutter cocking mechanism and the film winding mechanism, whereby the both mechanisms were disengaged by means of the clutch to permit independent operation of the shutter cocking mechanism, after which the clutch was automatically returned to its engaging condition in association with the subsequent shutter releasing operation. However, this attempt resulted in an excessively by long depressing stroke of a shutter button at the time of shutter releasing and the increase in resisting force against a depressing force for the shutter button, thus giving a rise to a camera blur.

It is accordingly an object of the present invention to provide a photographic camera providing multiple exposure, and capable of automatic return to its normal condition while avoiding the aforesaid shortcomings experienced with prior art cameras of this type.

It is another object of the present invention to provide a photographic camera having a clutch interposed between the shutter cocking mechanism and the film winding mechanism, said camera permitting automatic return of the clutch to its normal condition in association with the shutter cocking operation for multiple exposure, by using a simple mechanism.

A further object of the present invention is to provide a photographic camera of the type described, which eliminates any possibility of the film being fed during the shutter cocking operation for multiple exposure.

Pursuant to the present invention, the above and other objects are basically achieved by providing a novel and improved mechanism within a conventional camera which includes a film winding means having at least one engaging portion and a shutter cocking means having an engaging member selectively movable between a first position engageable with the aforesaid engaging portion and a second position unengageable with the same, said shutter cocking means when operated, being adapted to operate the film winding means by virtue of the engagement between the aforesaid engaging portion and engaging member in its first position. The novel structure of the present invention includes a mode-changing means for shifting the engaging member from the first to the second position and associated with the shutter cocking means for allowing the engaging member to return to the first position.

According to the aforesaid construction, the engagement of the engaging member with the engaging portion is effected only when one is in true coincidence with another, so even if the engaging member is returend to its first position during the operation of the shutter cocking means, the film winding means will not be operated until the completion of shutter cocking, unless the engaging member is in coincidence with the engaging portion, and thus multiple exposure can be achieved. However, if the camera is so constructed that the film winding means has another engaging member which may coincide with the engaging portion, there may result a possibility of these portions making undesirable engagement, thereby causing operation of the film winding means.

According to another aspect of the present invention, the shortcoming involved in the camera constructed as described above, is avoided by providing, in addition to the aforesaid construction, means for preventing the engaging member, which has once moved to its second position, from returning to the first position until the completion of the shutter cocking operation.

BRIEF DESCRIPTION OF THE DRAWINGS

Additional objects and advantages of the invention will become apparent during the course of the following specification when taken in connection with the accompanying drawings, in which:

FIG. 1 is a top plan view of a portion of a camera incorporating a first embodiment of shutter cocking and film winding mechanism of the present invention;

FIG. 2 is a top plan view of the camera of FIG. 1 with the top wall or plate removed to reveal the inner mechanism therewithin, the mechanism being shown in the initial stage of the single-exposure mode of operation;

FIG. 3 is a top plan view similar to FIG. 2, but showing the mechanism during the film-winding operation of the single-exposure mode;

FIG. 4 is a top plan view similar to FIG. 2, but showing the mechanism in the initial stage of the multiple-exposure mode of operation;

FIG. 5 is a side elevational view of some of the mechanism parts shown in FIGS. 2–4;

FIG. 9 is a top plan view of a portion of a camera incorporating a second embodiment of shutter-cocking and film winding mechanism of the present invention;

DESCRIPTION OF THE PREFERRED EMBODIMENTS

Figure 6:
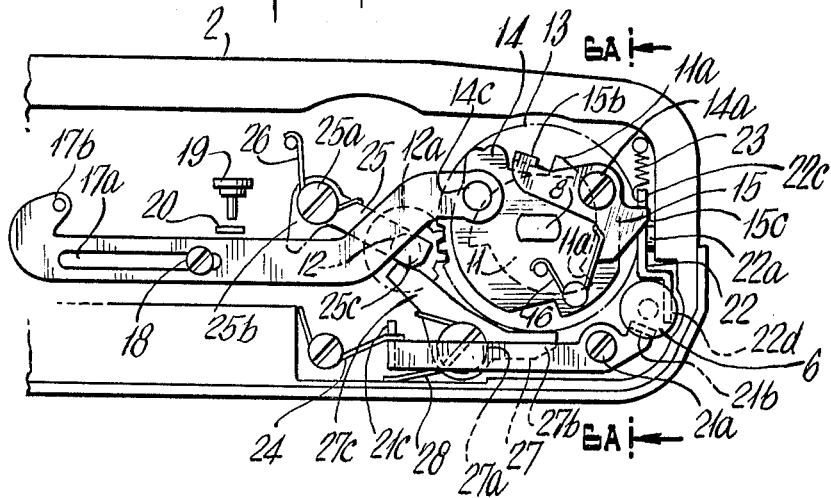
FIG. 6 is a bottom plan view of the camera of FIG. 1 with the bottom plate removed to reveal the inner mechanism therein, the position of the mechanism parts corresponding to the position of the upper parts in FIG. 2.

Referring in detail to the drawings, there is shown in FIG. 1 a top view of a camera in which a mode selection member 1 is mounted on the top wall of camera body 2. A film winding lever 10 is also mounted on the body 2 above the member 1 and concentrically therewith. Rotation of lever 10 in a counter-clockwise direction, as viewed in FIG. 1, is transmitted to a winding shaft 8 (shown in FIG. 2), by means of a coupling pin and a ratchet mechanism, to advance the film in the camera by one frame, as will be described in detail hereinafter.

A portion of the mode selection member 1 projects outwardly beyond the film winding lever 10 and is exposed for engagement by the user's finger for manual rotary movement between a first position indicated at A in FIG. 1, for self-cocking, and a second position B for interrupting the cooperation between winding shaft 8 and the film winding mechanism of the camera.

FIGS. 2 to 4 show a top view of the camera body 2 with the top wall or plate removed. As shown in FIG. 2, the mode selection member 1 is formed with a notch portion 1a. Rotatably mounted within the interior of the camera casing, but above the winding shaft 8, is a mode changing plate 3 having a bent flange portion 3a fitting within said notch portion 1a, so that the plate 3 is rotated in unison with the mode selection member 1 when the latter is manually turned. Rotation of the plate 3 is limited to a selected angle by a pin 4 secured within the camera body and fitting within a guide slot 3e in plate 3, this selected angle of rotation corresponding to the positions A and B of the mode selection member 1.

The mode changing plate 3 is formed with a cam shoulder portion having an upper cam surface 3d, a lower cam surface 3b, and a sloping surface 3c between the upper and lower surfaces 3d and 3b, as shown in FIG. 5. A cam follower 5, mounted on a shaft 5a, engages said cam shoulder portion and is movable upwardly and downwardly within the camera body in response to movement of the cam shoulder portion therebeneath. The lower end portion of the shaft 5a is formed with an operating surface 6a of conical shape, as shown in FIG. 6.

When the mode selection member 1 is in the position A shown in FIG. 2, the lower surface 3b of the cam shoulder portion engages the cam follower 5 to maintain shaft 5a in a lowered position. On the other hand, when the mode selection member 1 is in the position B shown in FIG. 4, the upper surface 3d of the cam shoulder portion engages cam follower 5 and urges the operating shaft 5a to an elevated position.

FIGS. 2, 3 and 4 show a coupling pin 7 which is affixed to the under surface of winding lever 10 for rotation in a counter-clockwise direction when winding lever 10 is actuated. The pin 7 is positioned to drive a winding shaft auxiliary plate 9 which is rigidly mounted on the winding shaft 8 and to rotate in unison therewith. The plate 9 is formed with shoulders 9a and 9b, the shoulder 9b being engaged by coupling pin 7 when the latter is rotated in counter-clockwise direction upon actuation of the winding lever 10, to cause the plate 9 to rotate in a counter-clockwise direction. When the mode changing plate 3 is in the position B shown in FIG. 4, counter-clockwise movement of plate 9 brings its shoulder 9a into engagement with bent portion 3a of mode changing plate 3 to thereby rotate the latter to the position A shown in FIG. 3. The rotational angle of the coupling pin 7 from its position of FIG. 2 to the position in which it engages the shoulder 9b of plate 9 is designated as the "angle of lost motion" of winding lever 10.

Figure 6A:
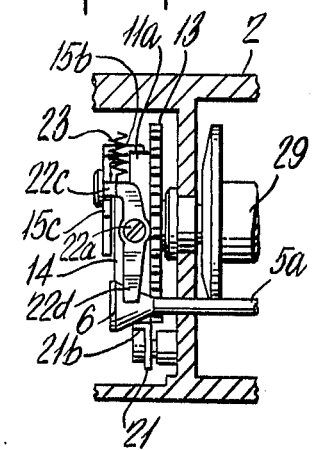
FIG. 6A is a section taken along line 6A-6A of FIG. 6.

FIG. 6A shows the cam follower shaft 5a extending through the camera body 2 and terminating at its lower end in an enlarged conical head 6 having an operating surface 6a. Thus, when the mode selection member 1 is in the position A shown in FIG. 2, the head 6 is in a lowered position projecting from the undersurface of the camera body as shown in FIG. 6A. On the other hand, when the lever 1 is in the position B, as shown in FIG. 4, head 6 will assume the elevation position shown in FIG. 8A.

Figure 7:
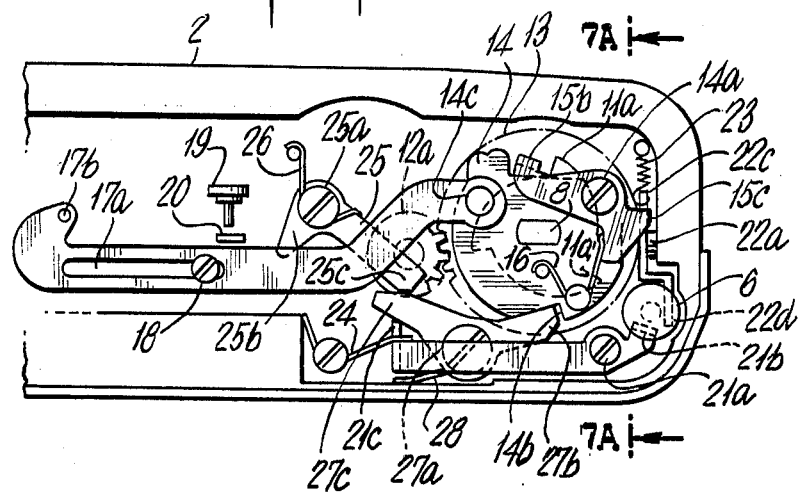
FIG. 7 is a bottom plan view similar to FIG. 6, but showing the mechanism in the shutter-cocked position of the single-exposure mode of operation.
Figure 8:
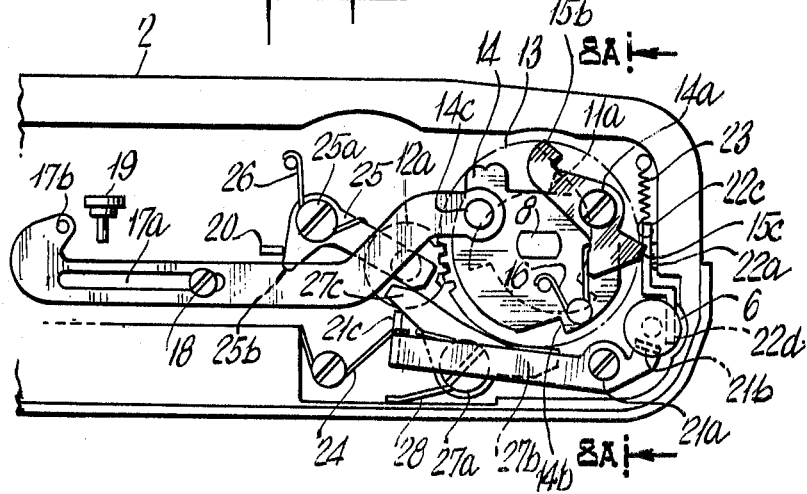
FIG. 8 is a bottom plan view similar to FIG. 6, but showing the mechanism in the multiple-exposure mode of operation.

FIGS. 6 to 8 show the bottom portion of the camera with the bottom plate removed. As shown therein, a film winding ratchet plate 11 is formed with three ratchet teeth 11a spaced at even intervals about the periphery of plate 11. The plate 11 is loosely fitted on the winding shaft 8 and is rigidly secured to a film winding spool 29. Rotation of the film winding ratchet plate 11 through an angle of substantially 120° will cause the film in the camera to be fed by one frame.

Rigidly mounted on spool 29, coaxially with plate 11, is a gear 13 which meshes with a gear 12a which is rigidly mounted on a sprocket shaft 12, thus constituting a film winding mechanism.

A rotary plate 14 is rigidly mounted on the winding shaft 8 and has two spaced shafts 14a and 14c projecting from the face thereof, and a notch 14b formed in its peripheral surface. Rotatably journalled on shaft 14a is a hook 15 which is biased by a spring 16 to rotate in a counter-clockwise direction relative to rotary plate 14. The hook 15 is formed at one end with a bent portion 15b which is engageable with one of the ratchet teeth 11a of film winding ratchet plate 11 when the rotary plate 14 is rotated. The other end of hook 15 is formed with a projection 15c which is engageable with an operating lever 22 pivotally mounted on a shaft 22a for rotation relative to the camera body. A coil spring 23 attached at one end to the camera body and at the other end to a bent arm portion 22c of operating lever 22, biases said operating lever in a direction to maintain its opposite arm 22d in engagement with the operating surface 6a of head 6. Thus, when the head 6 is in the lowered position of FIG. 6A, the bent end portion 22c of operating lever 22 is retracted from projection 15c of hook 15, and thus the bent portion 15b of hook 15 may be engaged by a ratchet tooth 11a. On the other hand, when the head 6 is in the elevated position shown in FIG. 8a, its operating surface 6a pivots operating lever 22 in a clockwise direction, so that its bent portion 22c engages projection 15c to thereby rotate hook 15 in a clockwise direction, whereby its bent portion 15b is located out of the path of travel of ratchet teeth 11a, as shown in FIG. 8.

Also journalled on the shaft 14c is one end of a shutter cocking correcting bar 17 formed with a guide slot 17a which slideably receives a pin 18 secured to the camera body. The other end of member 17 is formed with an operating ratchet 17b. Thus, when rotary plate 14 is rotated in a clockwise direction, the operating ratchet 17b will move to the right as viewed in FIG. 6 due to the cranking movement of connecting bar 17, thereby driving a shutter lever 19 from the released position shown in FIG. 6 to the shutter cocking position shown in FIG. 7. The rotary plate 14 must rotate through an angle of approximately 120° for thus driving the shutter lever 19.

The notch 14b in rotary plate 14 is engageable with a ratchet tooth 27b at one end of a locking lever 27 which is rotatably journalled in the camera body 2 by means of a shaft 27a. A spring 28 urges the lever 27 to rotate in a clockwise direction, so that its arm 27c engages the arm 25c of a drive lever 25. The drive lever 25 is rotatably mounted on the camera body 2 by a shaft 25a and is biased by a strong spring 26 to rotate in a clockwise direction. Thus, when the arms 25c and 27c engage each other, the locking lever 27 will be rotated in a counter-clockwise direction against the action of spring 28, whereby ratchet tooth 27b will engage the peripheral edge of rotary plate 14.

Operation of the drive lever 25 is controlled by an exposure detecting lever 20 which is movable from a position shown in FIG. 7, where the shutter has been cocked, to the position shown in FIG. 6, in response to the completion of the exposure. When the exposure is completed, as shown in FIG. 6, the lever 20 will move to the right to engage the arm 25b of drive lever 25, thereby rotating lever 25 is a counter-clockwise direction against the tension of spring 26, and releasing locking lever 27 so that its ratchet tooth 27b is retracted from rotary plate 14 by the action of spring 28.

Figure 8A:
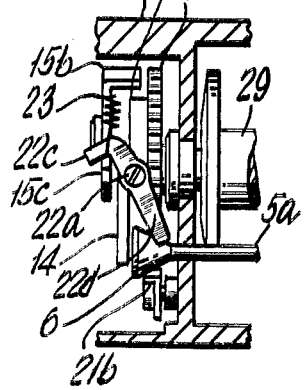
FIG. 8A is a section taken along line 8A—8A of FIG. 8.

A transmission lever 21 is mounted by shaft 21a on the camera body and is urged by spring 24 to rotate in a counter-clockwise direction. One arm 21b of lever 21 normally engages the operating surface 6a of head 6, while the other arm is formed with a projecting 21c. When the engaging portion 21b is pressed by the elevated operating surface 6a, as shown in FIG. 8A, the transmission lever 21 is rotated in a clockwise direction as shown in FIG. 8. In this condition, the projection 21c rotates locking lever 27 in a clockwise direction against the action of spring 26.

Figure 7A:
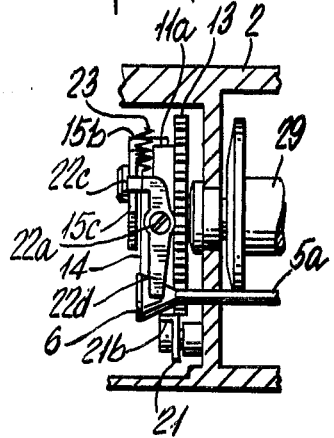
FIG. 7A is a section taken along line 7A—7A of FIG. 7.

In operation, when the mode selection member 1 is in the position A shown in FIG. 2 for effecting normal self-cocking operation, the mode shifting plate is so positioned that the lower surface 3b of its cam shoulder portion is in engagement with cam follower 5 so as to locate shaft 5a in its lowered position of FIG. 7A. In this position, the operating surface 6a of head 6 turns the operating lever 22 in a clockwise direction under action of spring 23 to thereby retract bent portion 22c of lever 22 from projection 15c. As a result, when the film winding lever 10 is normally actuated to turn rotary plate 14 in a clockwise direction, as viewed in FIG. 6, the bent portion 15b of hook 15 carried by said rotary plate 14 will engage ratchet 11a to rotate the film winding ratchet plate 11 in a clockwise direction, thereby winding the film. In addition, the rotation of rotary plate 14 is transmitted to shutter-cocking lever 19 by way of connecting member 17, so that shutter-cocking lever 19 is mounted in a direction to cock the camera shutter when the rotary plate 14 has rotated through an angle of sustantially 120°, the winding of one frame of film and the cooking of the shutter will have been completed and the winding operation will be stopped by means of a stopping mechanism (not shown).

After the aforementioned film winding and shutter cocking operations have been completed, the rotary plate 14 is rotated in a counter-clockwise direction so that it returns to its initial position. During this return movement, the ratchet teeth 11a turn in a direction in which they face away from the hook 15b and are not engageable therewith, so that ratchet plate 11 will not be rotated. In addition, since the exposure detecting lever 20 moves to the left as viewed in FIG. 7, the locking lever ratchet tooth 27b is positioned to engage with the notch 14b, thus preventing inadvertent rotation of rotary plate 14, which would cause feeding of the film.

When the exposure completion detecting lever 20 is moved to the right, as shown in FIG. 6, due to the shutter releasing operation, then the counter-clockwise rotation of locking drive lever 25 will cause locking ratchet 27b to be retracted from notch 14b, thus enabling the subsequent winding of film.

For effecting a multiple exposure on the same frame of a film which has once been exposed in the shutter-release completed condition as shown in FIG. 6, the mode selection member 1 is rotated in the clockwise direction to the position B as shown in FIG. 4, thereby rotating the mode changing plate 3 in the same direction such that the upper surface 3d of the cam shoulder portion will urge the cam follower 5 upwardly and elevate the shaft 5a and conical head 6 to the position shown in FIG. 8A.

Accordingly, operating surface 6a will rotate operating lever 22 in the counter-clockwise direction, while simultaneously rotating the transmission lever 21 in a clockwise direction as shown in FIG. 8. The hook 15 is engaged by lever 22 and is rotated in the clockwise direction shown in FIG. 8, so that the bent portion 15b thereof will be moved out of alignment with ratchet teeth 11a, and thus rotation of rotary plate 14 will not be transmitted to the film winding ratchet plate 11. In addition, rotation of transmission lever 21 causes its projection 21c to engage the locking lever 27, thereby rotating lever 27 in a clockwise direction against the action of spring 26, and thus disengaging ratchet tooth 27b from locking notch 14b.

Accordingly, when the winding lever 10 is manually rotated in a counter-clockwise direction, then the rotary plate 14 will be rotated in a clockwise direction as shown in FIG. 8, thereby effecting cocking of the shutter by way of the connecting bar 17. However, since the ratchet teeth 11a will not be engaged by the bent portion 15b, the film winding ratchet plate 11 will not be rotated and thus the film winding mechanism remains motionless. Furthermore, when rotary plate 14 is rotated back in the reverse direction, the projection 15c will be withdrawn from the bent lever portion 22c, such that the bent portion 15b will contact the periphery of the ratchet plate 11 but does not coincide with the position of the ratchet teeth 11a, thus precluding the possibility of ratchet wheel 11 of being rotated.

The coupling pin 7 engages shoulder portion 9b during the winding operation, as shown in FIG. 3 to thereby rotate the winding shaft auxiliary plate 9 in a counter-clockwise direction, during which the shoulder portion 9a engages the bent portion 3a of mode changing plate 3 to urge the same in a counter-clockwise direction, then the mode selection member 1 is returned to a position A, the transmission lever 21 is retracted from the winding locking lever 27, and the ratchet tooth 27b locks the winding mechanism, thus preventing the condition as shown in FIG. 7.

FIGS. 9 through 18 illustrate a second embodiment of camera incorporating multiple exposure means in accordance with the present invention, in which the mechanism is particularly adapted to prevent any possibility of the film winding means being driven inadvertently during the shutter cocking operation for multiple exposure. Where, as in the embodiments herein, the advancing of the film by one frame is effected by a ratchet wheel or plate having ratchet teeth spaced 120° apart, it is necessary to provide an engaging member or hook which is rotated around the ratchet wheel through an angle of about 120°.

In order to obtain a multiple exposure on a single frame, the engaging member, after switched to the second position, is moved to such a position that it will, when shutter cocking means is rotated, follow a rotational path which will not coincide with any parts of the film winding mechanism. Thus, even if the engaging member is returned to its initial or the first position, it will not engage the ratchet wheel during its subsequent rotation through an angle of about 120°, and the film winding means will not be operated to advance the film.

In practical manufacture of the camera, however, it sometimes happens that successful operation of the camera cannot be achieved unless the engaging member is rotated through an angle slightly in excess of 120°. In such a case, the engaging member may coincide with another engaging portion when rotated through an angle in excess of 120°, so that if the engaging member is previously returned to its initial position, the film winding means will be slightly operated. The embodiment which follows is constructed to eliminate such shortcomings.

Referring to FIG. 9, there is shown a camera body 52 upon the top plate of which is mounted a shutter release button 50 and a film winding lever 60. A mode selection member 51 is rotatably mounted beneath the film winding lever 60 and a portion thereof projects for manual actuation and consequent rotary movement between positions A and B. As in the previous embodiment, when the mode selection member 51 is in position A, the normal self-cocking winding operation will be effected, but when the member 51 is in position B, a multiple exposure will be effected.

Figure 10:
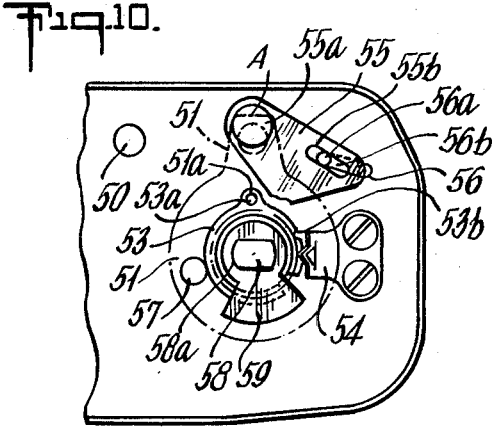
FIG. 10 is a top plan view of the camera of FIG. 9 with the top wall or plate removed to reveal the inner mechanism therewithin; the mechanism being shown in the initial stage of the single-exposure mode of operation.
Figure 11:
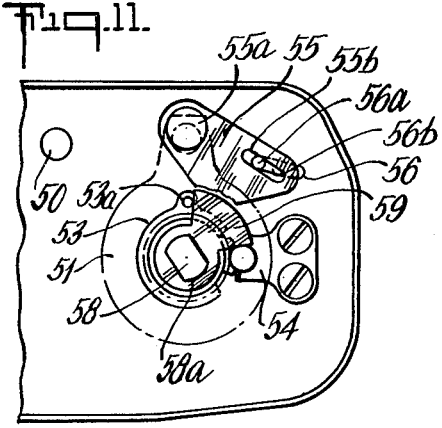
FIG. 11 is a top plan view similar to FIG. 10, but showing the mechanism during the film-winding operation of the single-exposure mode.
Figure 12:
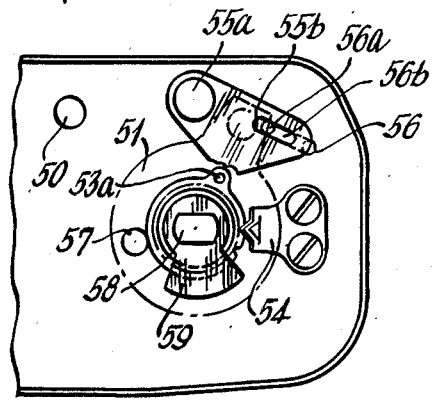
FIG. 12 is a top plan view similar to FIG. 10, but showing the mechanism in the initial stage of the multiple-exposure mode of operation.

FIGS. 10, 11 and 12 show the internal camera mechanism viewed from the top of the camera during various phases of the two modes of operation. FIG. 10 shows the mode selection member 51 in the position A, FIG. 11 shows the final condition of the film winding operation with member 5 in position A, while FIG. 12 shows the mode selection member 5 in position B. The mode selection member 51 is mounted concentrically with a winding shaft 58 having a projecting portion 58a of flattened, elongated non-circular cross section, upon which is fitted winding shaft auxiliary plate 59 for rotation of the latter with the winding shaft. A coupling pin 57, depending from film winding lever 60 engages plate 59 for rotating it and the winding shaft 58 one third revolution or 120° when the film winding lever 60 is manually turned in a counter-clockwise direction, thereby effecting both film winding and shutter cocking.

Loosely fitted on winding shaft 58 is a mode changing plate 53 which is rigidly coupled to the mode selection lever 51 by a pin 53a which extends through a hole 51a in the mode selection lever. The mode changing plate 53 is formed with two notches 53b which are engaged by a plate spring 54 to provide a suitable clicking action for the change-over operation of mode selection lever 51 between positions A and B.

Also mounted on the camera body is an actuating plate 55 which rotates about a pivot 55a. The actuating plate 55 is formed with an elongated slot 55b through which extends a pin 56a mounted on an arm 56b connected to a cooperating shaft 56. When the mode changing plate 53 is turned to the position B, as shown in FIG. 12, the pin 53a engages the actuating plate 55 and turns the latter in a counter-clockwise direction, thus causing the pin 56a to turn the cooperating shaft 56 in a counter-clockwise direction.

Described thus far is the film winding mechanism at the top of the camera body 52, in which movement of the mode selection lever 51 to position B, for changeover to the mode of multiple exposure, is transmitted by rotational movement of the cooperating shaft 56 to the internal mechanism in the lower part of the camera body, as shown in FIGS. 13, 14, 15, 16, 17 and 18.

Figure 13:
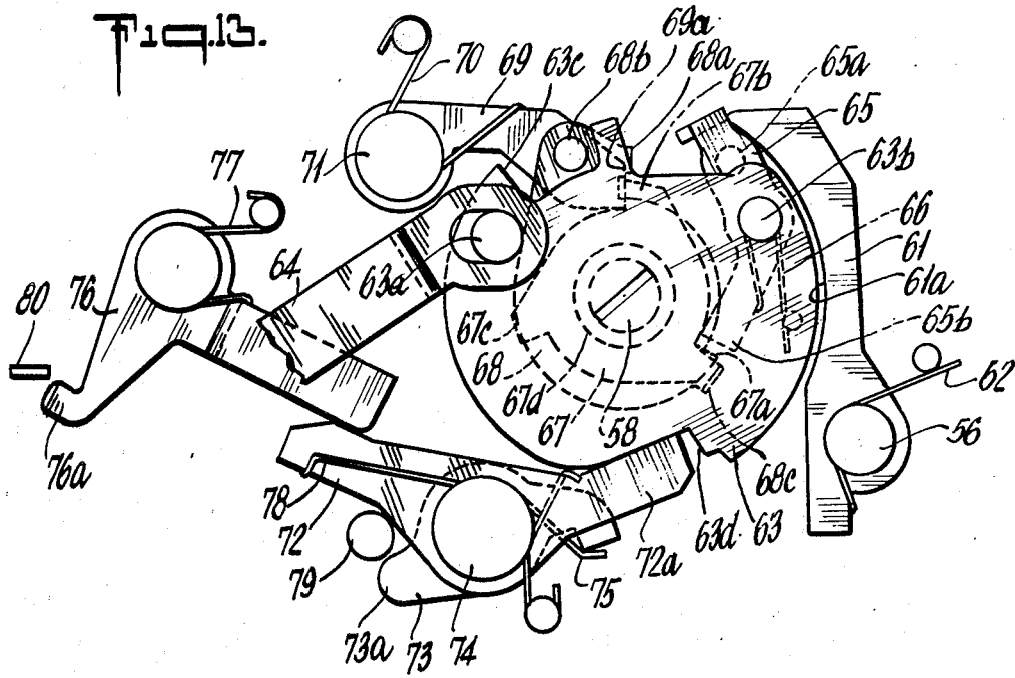
FIG. 13 is a bottom plan view of the mechanism at the bottom of the camera of FIG. 9, the mechanism parts corresponding to the position of the upper parts in FIG. 10 with the shutter cocked for operation in the single-exposure mode.

FIG. 13 shows the mechanism in the lower part of the camera body 52 in the condition shown in FIG. 10. Mounted on the lower end portion of the cooperating shaft 56 is a lever 61 which is turned when shaft 56 is rotated. Both the shaft 56 and the lever 61 are loaded by a spring 62 and biased to turn in a clockwise direction.

The film winding shaft 58 has a projecting bottom extension 58b of elongated shape upon which is keyed a disk 63 for rotation with said shaft 58. Mounted on the face of disk 63 is an upstanding pin 63a upon which is pivotally mounted a lever 64 which is adapted to cock the shutter device (not shown) of the camera. The disk 63 also carries a depending pin 63b upon which is journalled a hook 65, the latter being located beneath the disk 63 and biased by a spring 66 to rotate in a clockwise direction.

Figure 16:
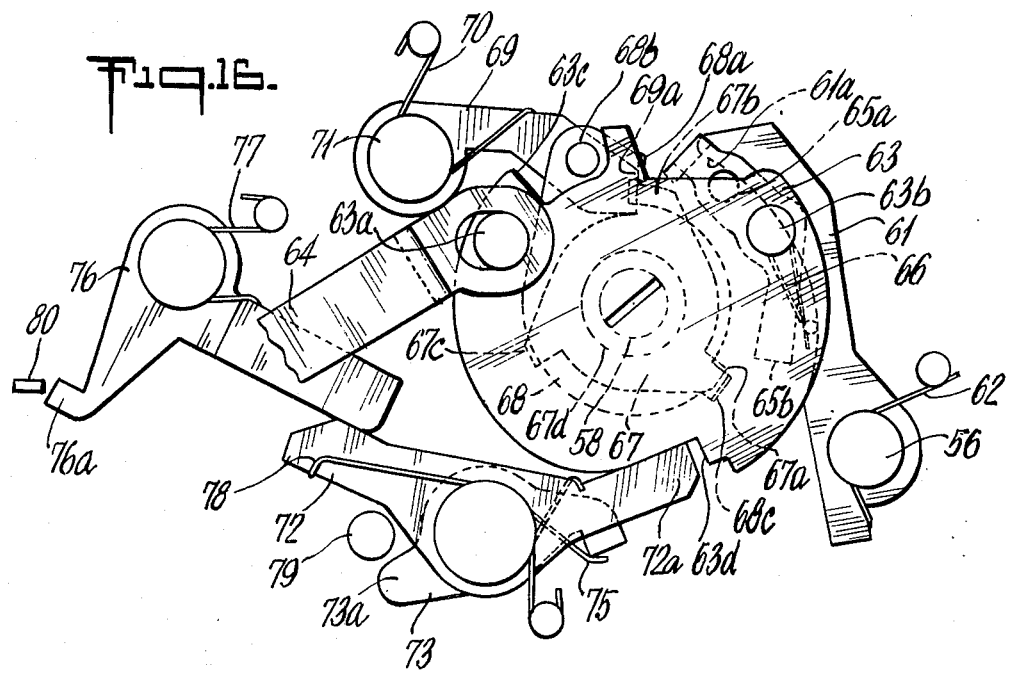
FIG. 16 is a bottom plan view similar to FIG. 13, but showing the mechanism set for the multiple-exposure mode of operation.

The hook 65 is positioned beneath the disk 63 so as to engage a ratchet tooth 67a of a film feeding ratchet plate 67 in such a manner that the rear end 65b of hook 65 is normally in engagement with the ratchet tooth 67a. On the other hand, at the time of change-over to the multiple exposure mode, the cooperating shaft 56 turns the lever 61 in a counter-clockwise direction, thus bringing a cam surface 61a of lever 61 into engagement with a pin 65a on hook 65. This urges hook 65 to turn in a counter-clockwise direction and moves the hook end portion 65b out of engagement with the ratchet tooth 67a, as shown in FIG. 16. It will be appreciated that although the hook 65 is carried in a circular path around shaft 58 by the disk 63 upon which it is mounted, the hook 65 is nevertheless urged in a counter-clockwise direction by the cam surface 61a so long as the pin 65a remains in contact with said cam surface.

The film feeding ratchet plate 67 has two additional ratchet teeth 67b and 67c, and also has a central projecting hub portion 67d upon which is loosely fitted a member 68. This member 68 is biased in a counter-clockwise direction by a spring (not shown) and has a bent end portion 68a which abuts the tip 69a of a lever 69 which is biased by spring 70 to rotate in a clockwise direction about a pin 71 affixed to the body of the camera. Under such a condition, a pin 68b on member 68 is spaced a slight distance from the wall surface 63c of a cut-away portion of disk 63, while a bent portion 68c of member 68 covers the outer end of ratchet tooth 67a of film feed ratchet plate 67, as shown in FIG. 13. At the same time, lever 69 serves to prevent reversed or counter-clockwise rotation of film feed ratchet plate 67 by engaging the ratchet tooth 67b, thereby maintaining the film feeding interval constant.

Two levers 72 and 73 are mounted upon a common pivot shaft 74 and are loaded by a spring 75 so as to engage each other. However, in the changing completed condition shown in FIG. 13, an additional lever 76 forcibly urges the levers 72 and 73 in a counter-clockwise direction under the action of a spring 77 which is stronger than a spring 78 which normally urges the levers 72 and 73 in a clockwise direction. Under the force of the lever 76, the levers 72 and 73 are pressed in a counter-clockwise direction so that the end of arm 72a of lever 72 is in engagement with a notch 63d of disk 63, thus preventing clockwise rotation of said disk 63. On the other hand, in such a condition the bottom end of the shutter release shaft 79 is left uncovered by the end 73a of lever 73 so that the shutter may be released by depressing the shutter release button 50 at the top of the camera.

Figure 14:
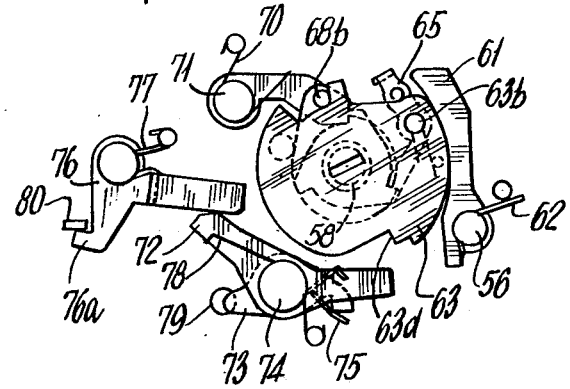
FIG. 14 is a bottom plan view similar to FIG. 13, but showing the mechanism after the shutter has been operated to complete an exposure.

The operation of the mechanism shown in FIGS. 9–18 is as follows:

When the mechanism is in the condition shown in FIGS. 10 and 13, with the shutter cocked for operation and the mode selection lever 51 set in position A for the single exposure mode, depression of the shutter release button 50 moves the shutter release shaft 79 downwardly toward the bottom of the camera to release a shutter device (not shown). Operation of the shutter release mechanism causes a lever arm 80 to move to the right from its position shown in FIG. 13 until the lever arm 80 engages the arm 76a of lever 76 and turns the latter in a counter-clockwise direction as shown in FIG. 14. Such movement of lever 76 permits levers 72 and 73 to rotate in a clockwise direction under the action of spring 78. The end portion 73a of lever 73 moves beneath the bottom of the shutter release shaft 79, which has returned to its normal elevated position, as shown in FIG. 14, and blocks the shaft 79 from further downward movement. Thus, even if the shutter release button is again depressed, the shutter will not be released, and inadvertent multiple exposure on the same frame of the film is prevented.

The film winding lever 60 may now be manually actuated to advance the film by one frame and simultaneously cock the shutter for its next release, in the following manner. With the mode selection lever 51 still in the position A, as shown in FIG. 10, the film winding lever 60 is rotated in a counter-clockwise direction, causing the coupling pin 57 to rotate about shaft 58, thereby rotating the winding shaft auxiliary plate 59 as well as the winding shaft 58 in a counter-clockwise direction, as shown in FIG. 11. The extent of movement of the coupling pin 57 around shaft 58 before the pin 57 engages the plate 59 corresponds to a so-called "angle of lost motion" of the winding lever 60.

Figure 15:
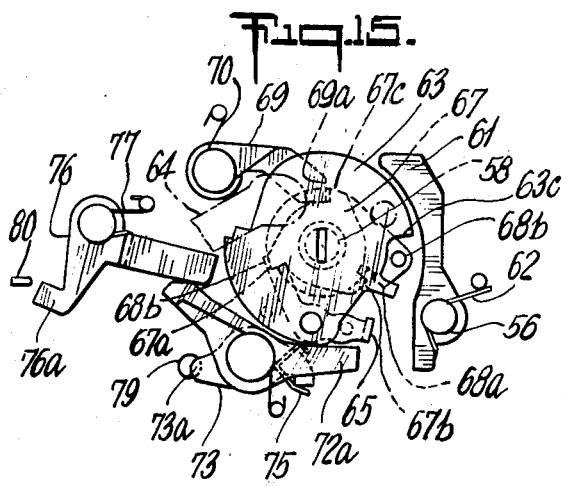
FIG. 15 is a bottom plan view similar to FIG. 13, but showing the mechanism during the film winding operation in the single-exposure mode.

Rotation of the winding shaft 58 rotates the disk 63 in a clockwise direction from its position of FIG. 14, the disk 63 forcing the lever 64 to the right to cock the shutter device (not shown). At the same time, the rear end 65b of hook 65 engages ratchet tooth 67a of film feed ratchet plate 67 as well as the bent portion 68c of member 68, thereby rotating film feed ratchet 67 and member 68 in the same clockwise direction, as shown in FIG. 15, so that the film winding mechanism (not shown) will be operated to wind the film and advance it one frame. In this manner, the shutter cocking is carried out in the final step, but the advancing movement for the shutter cocking is stopped by means of a winding stop mechanism (not shown). The stop position of the shutter cocking is such that the ratchet tooth 67c of film feed ratchet plate 67 is slightly biased to the right from the tip 69a of lever 69, as shown in FIG. 15. However, when the winding lever 60 and winding shaft 58 with disk 63 are returned to their initial positions, the film feed ratchet plate 67 will be rotated to some extent in a counter-clockwise direction due to the release of the winding force, so that ratchet tooth 67c will be locked by the tip 69a of lever 69. Thus further reversed rotation will be prevented as the parts return to the changing completed condition shown in FIG. 13.

The foregoing description applied to the single-exposure mode of operation of the camera. The following description applies to the multiple-exposure mode of operation of the camera mechanism.

When the mode selection lever 51 is set to position B for the multiple exposure mode of operation, as shown in FIG. 12, then the mode changing plate 53 will rotate in the clockwise direction, whereby the actuating plate 55 will ride on the pin 53a, and thus the cooperating shaft 56 will rotate in the clockwise direction.

As a result, in the lower part of the camera body, as shown in FIG. 16, the lever 61 will rotate in a counter-clockwise direction, thereby causing the hook 65 to rotate by reason of the engagement between cam surface 61a and pin 65a in a counter-clockwise direction. Such movement of hook 65 causes its rear end 65b to become disengaged from the ratchet tooth 67a of film feed ratchet plate 67. Under such a condition, when the winding shaft 58 and disk 63 are rotated in the clockwise direction because of the manual operation of the winding lever 60, the shutter device, as has been described earlier, will be cocked due to the lever 64 being forced to the right.

Figure 17:
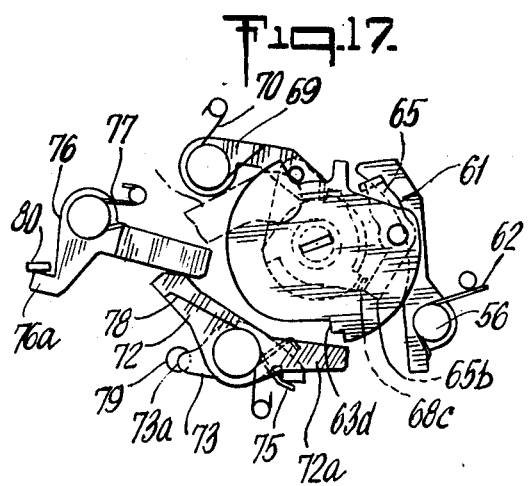
FIG. 17 is a bottom plan view similar to FIG. 16, but showing the mechanism during the shutter cocking operation in the multiple-exposure mode.
Figure 18:
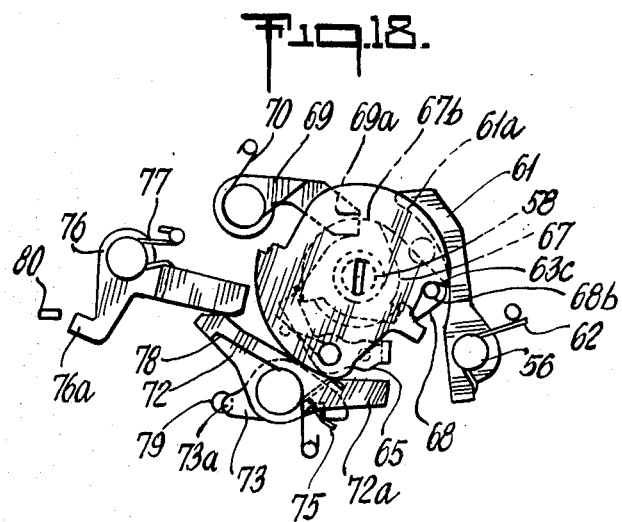
FIG. 18 is a bottom plan view similar to FIG. 16, but showing the mechanism at the end of the shutter cocking operation.

On the other hand, until the wall surface 63c of the disk 63 abuts the pin 68b of the member 68, the rear end 65b of the hook 65 has come to a position in which it rides on the bent portion 68c of member 68 due to the rotation of disk 63. (FIG. 17). Then, when disk 63 is further rotated in a clockwise direction, it engages pin 68b to cause the member 68 to rotate therewith, with the result that the rear end 65b of hook 65 will rotate without changing its position relative to the bent portion 68c, while providing for riding on the bent portion 68c of member 68. In addition, when the pin 65a of the hook 65 is detached from the cam surface 61a of lever 61, the hook 65 rides on the bent portion 68c under action of the spring 66 and will be rotated until the termination of the winding operation, as shown in FIG. 18.

Thus, there is no danger that the hook 65 will engage the ratchet tooth 67c upon rotation of the disk 63, and thus film winding ratchet plate 67 will not be rotated, thereby permitting the so-called multiple exposure winding in which the shutter device is cocked without the film being advanced by a frame.

Meanwhile, at the completion of the advancing movement of shutter cocking, in the upper part of a camera body, the coupling pin 57 urges the pin 53a of mode changing plate 53 in a counter-clockwise direction by means of the winding shaft auxiliary shaft 59, to thereby return the mode selection member 51 to its initial position, A, such that the subsequent winding will be restored to the normal self-cocking and film winding mode of operation. In other words, if the winding lever 60, coupling pin 57, winding shaft 58 and disk 63 are returned to their initial positions, the member 68 will be stopped by the engagement of its bent portion 68a with the lever tip 69a, thus disengaging the rear end 65b of hook 65 from the bent portion 68c of member 68, and the parts will be restored to their original positions of FIGS. 10 and 13.

While preferred embodiments of the present invention have been shown and described herein, it is obvious that numerous additions, changes and omissions may be made in such embodiments without departing from the spirit and scope of the invention.

I claim:

1. A photographic camera for multiple exposure including a first rotatable member for effecting a film winding operation and a second rotatable member for effecting a shutter cocking operation mounted coaxially with said first rotatable member, said camera having a single exposure mode of operation in which the film winding operation is effected in association with the shutter cocking operation, and a multiple exposure mode of operation in which the shutter cocking operation is effected without the film winding operation, said first rotatable member having at least a first engaging portion, said second rotatable member having hooking means mounted thereon for movement between a first position in which it is engageable with said first engaging portion for rotation of said second member with said first member to effect said single exposure mode of operation, and a second position in which said hooking means is unengageable with said first engaging portion for rotation of said second rotatable member alone without said first rotatable member to effect said multiple exposure mode of operation, and manually operable mode selector means for controlling the position of said hooking means, said mode selector means having a single exposure mode position in which the hooking means is maintained in its first position, and a multiple exposure mode position in which it sets the hooking means in its second position, said second rotatable member having a member moveable in accordance with the rotation thereof, said mode selector means including an engaging portion which is set for engagement with said moveable member in the multiple exposure mode position of said mode selector means, said moveable member being moved into engagement with the engaging portion of said mode selector means to move said mode selector means from its multiple exposure mode position to its single exposure mode position in accordance with the shutter cocking operation, whereby said hooking means is automatically allowed to return from its second position to its first position to prepare for the next engagement with the engaging portion of said first rotatable member, said first rotatable member including a first rotatable disk having a plurality of notches provided at even intervals along the periphery thereof for the engagement with said hooking means, said second rotatable member including a second rotatable disk co-axial with said first disk and having said hooking means peripherally mounted thereon and rotatable from a rest position to an advanced position for cocking the shutter, said second disk rotating said first disk through an angle formed by the respective interval between adjacent notches through the rotation of said second disk from said rest to advanced position with said hooking means in said first position for advancing one frame of the film and returnable to said rest position on the completion of the shutter cocking operation, said mode selector means including a moveable cam member engaging with said hooking means when said mode selector means is in said multiple exposure mode position for setting said hooking means at said second position while said second disk is in said rest position.

2. A photographic camera for multiple exposure including a first rotatable member for effecting a film winding operation, a second rotatable member for effecting a shutter cocking operation mounted coaxially with said first rotatable member, said camera having a single exposure mode of operation in which the film winding operation is effected in association with the shutter cocking operation, and a multiple exposure mode of operation in which the shutter cocking operation is effected without the film winding operation, said first rotatable member having at least a first engaging portion, said second rotatable member having hooking means mounted thereon for movement between a first position in which it is engageable with said first engaging portion for rotation of said second member with said first member to effect said single exposure mode of operation, and a second position in which said hooking means is unengageable with said first engaging portion for rotation of said second rotatable member alone without said first rotatable member to effect said multiple exposure mode of operation, and manually operable mode selector means for controlling the position of said hooking means, said mode selector means having a single exposure mode position in which the hooking means is maintained in its first position, and a multiple exposure mode position in which it sets the hooking means in its second position, said second rotatable member having a member movable in accordance with the rotation thereof, said mode selector means including an engaging portion which is set for engagement with said moveable member in the multiple exposure mode position of said mode selector means, said moveable member being moved into engagement with the engaging portion of said mode selector means to move said mode selector means from its multiple exposure mode position to its single exposure mode position in accordance with the shutter cocking operation whereby said hooking means is automatically allowed to return from its second position to its first position to prepare for the next engagement with the engaging portion of said first rotatable member, a third rotatable member coaxial with said first rotatable member, said third rotatable member following the rotation of said second rotatable member preceded by a certain angle of lost motion of said second rotatable member for engaging with said hooking means to prevent the hooking means from returning to said first position, and means for stopping the rotation of said third rotatable member for disengaging said hooking means from said third rotatable member at a position adjacent to said first engaging portion to prepare for the next engagement between said hooking means and said first engaging portion.

3. A photographic camera according to claim 2, in which said first rotatable member includes a first rotatable disk having a plurality of notches provided at even intervals along the periphery thereof for the engagement with said hooking means; said second rotatable member includes a second rotatable disk co-axial with said first disk and having said hooking means peripherally mounted thereon and rotatable from a rest position to an advanced position for cocking the shutter, said second disk rotating said first disk through the rotation from said rest to advanced position thereof with said hooking means in said first position for advancing one frame of the film and returnable to said rest position on the completion of the shutter cocking operation, said mode selector means includes a movable cam member engaging with said hooking means when said mode selector means is in said multiple exposure mode position for setting said hooking means at said second position while said second disk is in said rest position, said third rotatable member includes a third rotatable disk coaxial with said first disk and having a third engaging portion, said third disk following the rotation of said second disk from said rest to advanced position preceded by a certain angle of lost motion of said second disk for engaging said third engaging portion with said hooking means to prevent the hooking means from returning to said first position, and said stopping means is disposed so as to stop the rotation of said third disk as said second disk is returning to said rest position, whereby said second disk further idly rotates to said rest position with said hooking means disengaged from said third engaging portion.

4. A photographic camera for multiple exposure comprising film winding means having at least one engaging portion; shutter cocking means movable from a rest position to an advanced position for shutter cocking and further returnable to said rest position, said shutter cocking means having an engaging member movable between a first position engageable with said engaging portion upon the movement of said shutter cocking means from said rest to advanced position and a second position unengageable with the same for operating said film winding means in association with the operation of said shutter cocking means between said engaging portion and said engaging member in said first position, mode changing means for changing said engaging member from said first to second position with said shutter cocking means in said rest position for allowing said shutter cocking means to initiate the movement from said rest to advanced position without the operation of said film winding means, said mode changing means being further related with said shutter cocking means for allowing said engaging member to return from said second to first position in the course of the movement of said shutter cocking means from said rest to advanced position, and means for retaining said engaging member in said second position before said mode changing means allows said engaging member to return to said first position, said retaining means further cooperating with the movement of said shutter cocking means to allow said engaging member to return from said second to first position in the course of the return of said shutter cocking means from said advanced to rest position.

5. A photographic camera for multiple exposure comprising a first rotatable disk for effecting a film winding operation, said first disk having a plurality of engaging portions provided at even intervals along the periphery thereof; a second rotatable disk coaxial with said first disk and having a hooking means peripherally mounted thereon, said second disk being rotatable from a rest position to an advanced position for cocking the shutter, said hooking means being moveable between a first position in which it is engageable with said engaging portions for rotation of said second disk with said first disk and a second position in which said hooking means is unengageable with said engaging portions for rotation of said second disk alone without said first disk, said second disk rotating said first disk through an angle formed by the respective interval between adjacent engaging portions through the rotation of said second disk from said rest to advanced position with said hooking means in said first position for advancing one frame of the film, said second disk being returnable to said rest position after the completion of the shutter cocking operation; a mode selector means for controlling said hooking means, said mode selector means having a single exposure mode position in which it allows said hooking means to be in said first position and a multiple exposure mode position in which it sets the hooking means at said second position while said second disk is in said rest position; and means related to the shutter cocking operation for automatically returning said mode selector means from said multiple exposure mode position to said single exposure mode position to allow said hooking means to be in said first position prior to the return of said second disk to said rest position.

6. A photographic camera according to claim 5, wherein said first and second disks are positioned at the lower part of the camera, and said mode selector means includes a manually operable member positioned at the upper part of the camera for manual operation of said mode selector means, and an interconnecting member for transmitting the operation of said manually operable member to said hooking means.

7. A photographic camera for multiple exposure comprising: a first rotatable disk for effecting a film winding operation, said first disk having a plurality of engaging portions provided at even intervals along the periphery thereof; a second rotatable disk coaxial with said first disk and carrying a hooking means peripherally mounted thereon, said second disk being rotatable from a rest position to an advanced position for cocking the shutter, said hooking means being moveable between a first position in which it is engageable with said engaging portions for rotation of said second disk with said first disk and a second position in which said hooking means is unengageable with said engaging portions for rotation of said second disk alone without said first disk, said second disk rotating said first disk through an angle formed by the respective interval between adjacent engaging portions through the rotation of said second disk from said rest to advanced position with said hooking means in said first position for advancing one frame of the film and returnable to said rest position after the completion of the shutter cocking operation; a mode selector means having a single exposure mode position in which it allows said hooking means to be in said first position and a multiple exposure mode position in which it engages with said hooking means to move the hooking means to said second position while said second disk is in said rest position, said second disk having an intermediate position in the course of its rotation for shutter cocking, beyond which said second disk carries said hooking means to make it unable to engage with said mode selector means in said multiple exposure position; and means for retaining said hooking means in said second position prior to the rotation of said second disk beyond said intermediate position.

8. A photographic camera according to claim 7, wherein said retaining means comprises a member positioned to engage said hooking member in said second position prior to the rotation of said second disk beyond said intermediate position, for retaining said hooking member in said second position by means of its engagement therewith.

9. A photographic camera according to claim 8, wherein said member of the retaining means is a rotatable member coaxial with said first disk, said rotatable member following the rotation of said second disk preceded by a selected angle of lost motion of said second disk for engaging with said hooking means to prevent the hooking means from returning to said first position.

10. A photographic camera according to claim 9 further comprising means related to the shutter cocking operation for automatically returning said mode selector means from said multiple exposure mode position to said single exposure mode position and means for stopping the rotation of said rotatable member of the retaining means prior to the return of said second disk to said rest position for disengaging said hooking means from said rotatable member to prepare for the next engagement between said hooking means and said engaging portions.

* * * * *